United States Patent [19]

Benford et al.

[11] Patent Number: 5,241,476
[45] Date of Patent: Aug. 31, 1993

[54] ACCELERATION PREDICTION RESPONSIVE ADAPTIVE UPSHIFT CONTROL

[75] Inventors: Howard L. Benford, Bloomfield Hills; Maurice B. Leising, Clawson, both of Mich.

[73] Assignee: Chrysler Corporation, Highland Park, Mich.

[21] Appl. No.: 914,509

[22] Filed: Jul. 14, 1992

Related U.S. Application Data

[63] Continuation of Ser. No. 520,698, May 8, 1990, abandoned.

[51] Int. Cl.$^5$ .................................................. B60K 41/08
[52] U.S. Cl. .................................. 364/424.1; 74/866
[58] Field of Search ............... 364/424.1; 74/861, 866

[56] References Cited

U.S. PATENT DOCUMENTS

| | | | |
|---|---|---|---|
| 4,338,666 | 7/1982 | Suzuki et al. | 74/866 X |
| 4,414,863 | 11/1983 | Heino | 74/866 |
| 4,569,255 | 2/1986 | Holmes | 74/866 |
| 4,599,917 | 7/1986 | Léorat et al. | 74/866 |
| 4,638,690 | 1/1987 | Hattori et al. | 364/424.1 |
| 4,703,304 | 10/1987 | Muguruma et al. | 74/861 X |
| 4,823,646 | 4/1989 | Yoshimura et al. | 74/866 |
| 4,947,331 | 8/1990 | Speranza | 364/424.1 |
| 4,977,992 | 12/1990 | Ohtsuka et al. | 364/424.1 |

Primary Examiner—Jack B. Harvey
Assistant Examiner—Edward Pipala
Attorney, Agent, or Firm—Mark P. Calcaterra

[57] ABSTRACT

A method of adaptively scheduling an upshift. The method determines whether the vehicle can maintain speed in a high gear and, if it cannot, to inhibit the lower to higher gear upshift. This is accomplished by observing vehicle acceleration in the lower gear, determining whether the vehicle will be capable of providing a predetermined value of acceleration after an upshift of the gear assembly to a higher gear. If the vehicle will not be capable of providing the predetermined value of acceleration, then the upshift will be prevented.

7 Claims, 2 Drawing Sheets

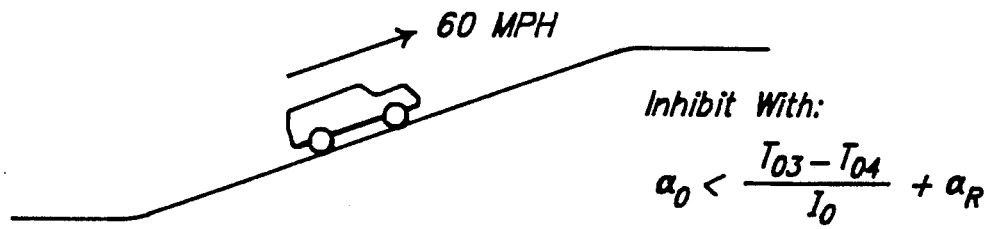
Inhibit With:
$$\alpha_O < \frac{T_{O3} - T_{O4}}{I_O} + \alpha_R$$
Where $\alpha_O$ = Transmission Output Acceleration
$\alpha_R$ = Required Acceleration Level
$I_O$ = Vehicle Inertia (@ Output)
$T_{O3}$ = Output Torque In 3rd
$T_{O4}$ = Potential Output Torque In 4th
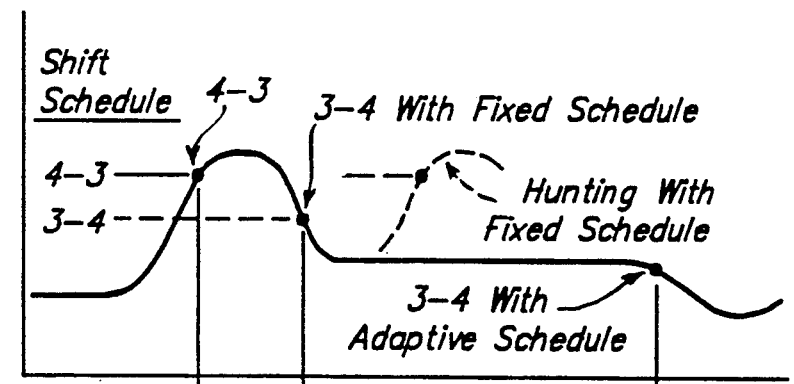
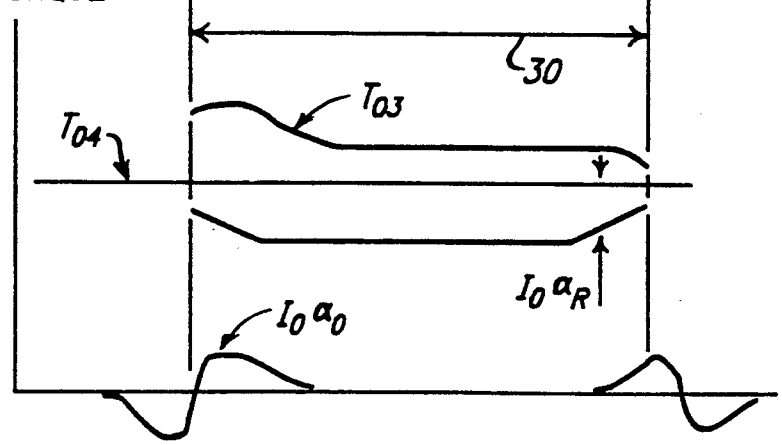

ACCELERATION PREDICTION RESPONSIVE ADAPTIVE UPSHIFT CONTROL

This is a continuation of U.S. patent application Ser. No. 07/520,698, filed May 8, 1990, now abandoned.

BACKGROUND OF THE INVENTION

1. Field of the Invention

The present invention relates to an automatic transmission primarily intended for motor vehicle use, and more particularly to an "adaptive" transmission that is controlled electronically and hydraulically.

2. Description of Related Art

In general, the major components featured in an automatic transmission are: a torque convertor, fluid pressure-operated multi-plate drive or brake clutches and/or brake bands which are connected to individual elements of planetary gear sets in order to perform gear shifts without interrupting tractive power. The control system of the automatic transmission is typically hydraulically operated through the use of several valves to direct and regulate the supply of pressure. This hydraulic pressure control will cause either the actuation or deactuation of the respective clutches and/or bands for effecting gear changes in the transmission.

However, in recent years, a more advanced form of transmission control system has been developed, which enables the transmission to adapt itself to changing conditions. In this regard, U.S. Pat. No. 4,875,391, issued on Oct. 24, 1989 to Leising, et al., sets forth a fundamental development in this field. Specifically, this patent discloses an automatic transmission which features an "adaptive" control system that includes an electronic controller and electrically operated solenoid-actuated valves for controlling certain fluid pressures for effecting gear changes in the transmission.

One characteristic of four-speed transmissions is that the transmission may hunt between third and fourth gear while the vehicle ascends a moderately steep grade. When the vehicle starts up the grade and begins to lose speed in fourth gear, the driver, in an attempt to maintain speed, depresses the accelerator pedal enough to make a fourth to third gear kickdown shift. In third gear, the vehicle accelerates. The driver would then lift his foot, and a third to fourth gear upshift would be triggered. As a result, the transmission constantly or repeatedly hunts between third and fourth gear which is undesired.

SUMMARY OF THE INVENTION

It is, therefore, one object of the present invention to eliminate hunting between third and fourth gear for a transmission that is controlled electronically and hydraulically as a vehicle ascends a grade.

It is another object of the present invention to make an upshift adaptable to current vehicle operating conditions.

It is yet another object of the present invention to make a third to fourth gear upshift adaptable to current vehicle operating conditions.

To achieve the foregoing objects, the present invention provides a method of adaptively scheduling an upshift of the gear assembly for an automatic transmission. The method determines whether the vehicle can maintain speed in one predetermined gear and, if it cannot, inhibits an upshift from another predetermined gear to the one predetermined gear. This is accomplished by observing vehicle acceleration in the other predetermined gear and comparing it to a value necessary to indicate the one predetermined gear acceleration capability. If the observed value of acceleration is lower, the upshift is inhibited.

One advantage of the present invention is that repeated hunting between third and fourth gear for a transmission that is controlled electronically and hydraulically as the vehicle ascends a grade is eliminated. Another advantage of the present invention is that an upshift is adaptable between gears of the transmission. Yet another advantage of the present invention is that an upshift from third to fourth gear is adaptable to current vehicle operating conditions. A further advantage of the present invention is that if the third gear acceleration is too low, the electronic controller inhibits the transmission from performing a third to fourth gear upshift.

Other objects, features and advantages of the present invention will be readily appreciated as the same becomes better understood after reading the following description in light of the accompanying drawings.

BRIEF DESCRIPTION OF THE DRAWINGS

FIG. 1 is a view illustrating a vehicle ascending a grade and a shift inhibit equation according to the present invention.

FIG. 3 is a graph illustrating throttle and torque for the method of FIGS. 1 and 2.

DESCRIPTION OF THE PREFERRED EMBODIMENT(S)

Figure 2:
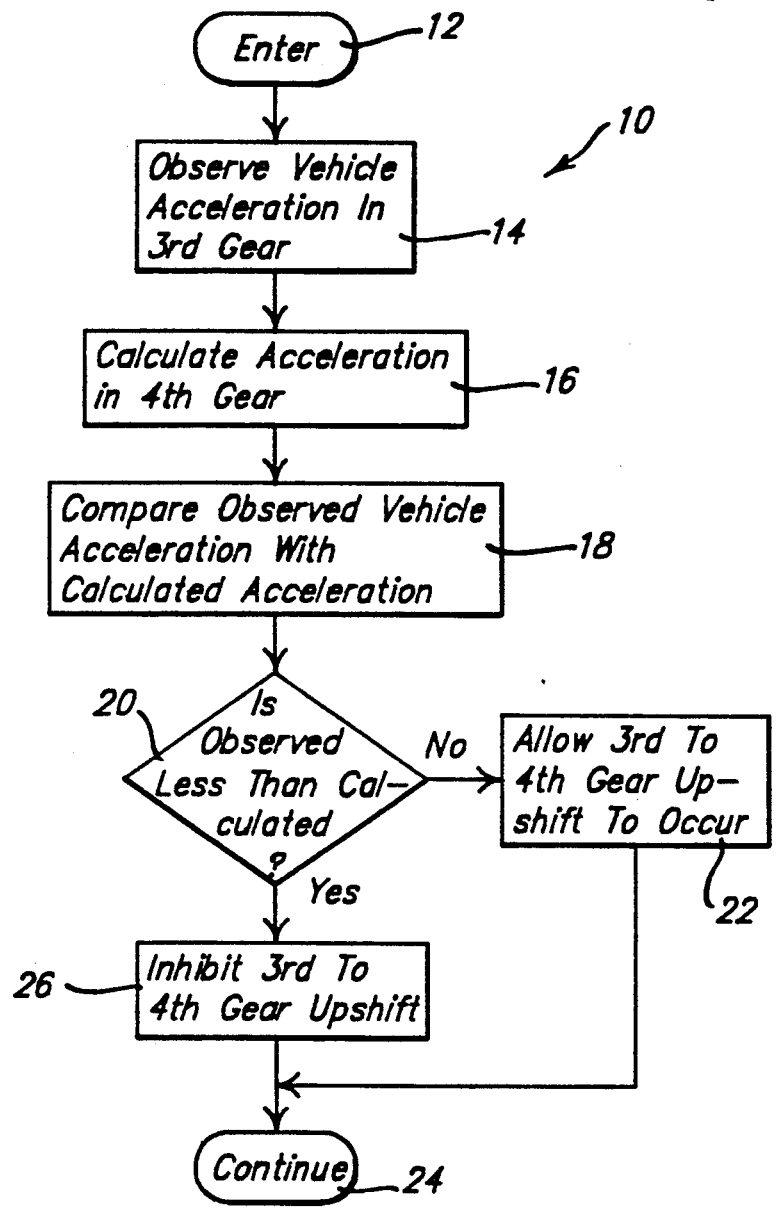
FIG. 2 is a flowchart for a method of adaptively scheduling an upshift according to the present invention.

The present invention is a method of adaptive scheduling an upshift, particularly a third to fourth gear upshift. A transmission (not shown, but see U.S. Pat. No. 4,875,391) is adapted to be used in a vehicle (See FIG. 1) such as an automobile. The transmission is controlled by a control system including an electronic controller (not shown, but see U.S. Pat. No. 4,875,391) and a plurality of solenoid-actuated valves (not shown, but see U.S. Pat. No. 4,875,391). Such a transmission and control system is disclosed in U.S. Pat. No. 4,875,391 to Leising et al., the disclosed material of which is hereby incorporated by reference.

The purpose of the present invention is to inhibit an upshift of the gear assembly of the transmission if the vehicle cannot maintain constant speed or greater during higher gear operation. More specifically, the purpose of the method according to the present invention is to inhibit a third to fourth (3-4) gear upshift if the vehicle cannot maintain at least constant speed during fourth gear operation of the transmission. This will be done by 1) observing vehicle conditions and vehicle acceleration in lower or third gear, 2) predicting the vehicle acceleration capability for higher or fourth gear operation and 3) only allowing a lower-higher or 3-4 upshift to occur if a positive acceleration in higher or fourth gear can be maintained.

The following equations represent 3rd (lower) and 4th (higher) gear operation:

$$F_{3rd} = M_{veh} a_{3rd}$$

Where $F_{3rd}$ is the NET DRIVING FORCE for a given gear, like 3rd, and represents the force in excess of that required to maintain constant speed; $M_{veh}$=VEHICLE MASS; and $\alpha_{3rd}$ is the ACCELERATION for a given gear, like 3rd.

$$F_{4th} = M_{veh}\alpha_{4th}$$

Where $F_{4th}$ is the NET DRIVING FORCE for a given gear, like 4th, and represents the force in excess of that required to maintain constant speed; and $\alpha_{4th}$ is the ACCELERATION for a given gear, like 4th. Subtracting and rearranging yields:

$$\alpha_{3rd} = [F_{3rd} - F_{4th}][1/M_{veh}] + \alpha_{4th}$$

For $\alpha_{4th} \geq $ zero (0), then:

$$\alpha_{3rd} \geq [F_{3rd} - F_{4th}][1/M_{veh}]$$

If this equation is not satisfied, the 3-4 (lower-higher) gear upshift of the transmission should be inhibited by the control system.

Referring to FIG. 1, the above shift inhibit equation may be redefined as follows:

$$\alpha_O < \{[T_{o3} - T_{o4}]/I_o\} + \alpha_R$$

where:
$\alpha_O$ = transmission output acceleration in a given gear, like 3rd gear
$\alpha_R$ = required acceleration level in a given gear, like 4th gear
$I_0$ = vehicle inertia (at output)
$T_{03}$ = transmission output torque in a given gear, like third gear
$T_{04}$ = potential transmission output torque in a given gear, like fourth gear If this shift inhibit equation is satisfied, the lower to higher or third to fourth gear upshift of the transmission is inhibited by the control system. The terms in the above shift inhibit equation may be determined as follows:

$\alpha_o = \delta N_o$/time; the change in output speed ($N_o$) observed continually in relation to time
$T_{o3} = T_{t3} - T_{pt3}$
where: $T_{t3}$ = 3rd-gear turbine torque
$\quad = T_e - T_{pe}$ if in Partial Lock Up (PLU) or Lock Up (LU) conditions or when $N_t > .85N_e$;
otherwise:
$\quad = [10N_e + C_1 (N_e - N_t)]N_e(10^{-6})$
limit: $\leq [130(N_e - N_t) - 2N_e]N_e(10^{-6})$
where: $T_e$ = Engine Torque (see below)
$T_{pe}$ = Engine parasitic torque
$\quad$ = Predetermined constant or function
$N_e$ = Engine Speed
$N_t$ = Turbine Speed
$C_1$ = A constant based on the particular torque converter in use, which may be determined by an engine code stored in memory
$T_{pt3}$ = 3rd-gear parasitic turbine torque
$\quad = C_9 + C_{10} N_o$
where: $C_9, C_{10}$ are predetermined constants based on testing
$T_{o4} = .689(T_{t4} - T_{pt4})$
where: .698 = 4th-gear ratio
$T_{t4}$ = 4th-gear turbine torque
$\quad = R_T T_{t4}$
where: $R_T$ = torque converter torque ratio
$\quad = 1.0$ if $N_o > N_{tL1}$ (4th); otherwise
$\quad = C_2 + C_3 X$ If $X < X^1$, Limit $\geq .98$
$\quad = C_4 + .0057X$ If $X > X^1$
where: $N_{tL1}$ (4th) Minimum turbine speed for PLU in 4th $C_2, C_3, C_4, X^1$ are constants based on the particular torque converter in use, which may be determined by an engine code stored in memory
$X = T_{t4} \times 10^6/N_o^2$
$T_{t4}$ = 4th-gear impeller torque
$\quad = K_T T_{emax} - T_{pe}$
where: $K_T$ = torque factor (see below)
$T_{emax}$ maximum engine torque at standard
$\quad =$
atmospheric pressure, in 4th (e.g., at 4-3 shift point), a predetermined constant which may be determined by an engine code stored in memory
$T_{pt4}$ = 4th-gear parasitic turbine torque
$\quad = C_{11} + C_{12}N_o + C_{13}N_o^2$
where: $C_{11}, C_{12}, C_{13}$ are constants based on testing
$I_o$ = Inertia of vehicle reflected at transmission output; a predetermined constant based on the engine and vehicle which may be a tabled value
$\alpha_R$ = A predetermined function of predicted 4th-gear acceleration given by:
$\alpha_o - (T_{o3} - T_{o4})/I_o$ Torque factor ($K_T$)

The purpose of this parameter is to find the reduction in potential engine torque due to atmospheric pressure reduction at altitude. $K_T$ is initialized to 1.0 at start up and updated continually under the appropriate engine operating conditions (e.g., $1200 \leq N_e \leq 3200$ and throttle $<25°$) as follows:

$K_T = \frac{7}{8} K_T$(previous) + $\frac{1}{8}$ (MAP/MAP*)
where: MAP = Manifold Absolute Pressure, (Hg)
MAP* = Standard Atmospheric Pressure MAP
$\quad = 30 - [C_5/(THR-C_6) - C_7](N_e - C_8)/100$
where: $C_5, C_6, C_7, C_8$ are constants based on engine testing, which may be determined by an engine code stored in memory
THR = Throttle angle
$N_e$ = Engine Speed Engine Torque ($T_e$)

The purpose of this parameter is to estimate engine torque based primarily on MAP $T_e = \text{MAP} \times f(N_e) - T_f - (.097V_D) \times K_T$
where: $f(N_e)$ = gain, MAP to torque, lbf ft/Hg which may be a piece-wise linear function of $N_e$ based on engine code
$T_f$ = friction torque
$V_D$ = displacement, cu. in
these are constants which may be based on engine code Referring to FIG. 2, a flowchart 10 is shown for a method of adaptively scheduling an upshift such as a third to fourth gear upshift. The methodology enters through bubble 12 and advances to block 14. The electronic controller observes the vehicle acceleration ($\alpha_o$) in a predetermined lower gear such as third gear as the vehicle ascends a grade. The electronic controller observes the vehicle acceleration by reading transmission output speed from a speed sensor at regular predetermined time periods or intervals as previously described. The interval is long enough (about one second) to provide filtering from the effect of various road conditions or output speed ($N_o$).

The methodology advances from block 14 to block 16 and calculates the required acceleration ($\alpha_R$) in a predetermined higher gear such as fourth gear which indicates the capability of achieving predicted acceleration in the predetermined higher gear such as fourth gear according to the shift inhibit equation previously described and shown in FIG. 1. It should be appreciated that suitable sensors are used to measure parameters and provide corresponding signals used in the shift inhibit equation.

The methodology advances from block 16 to block 18 and compares the observed acceleration ($a_o$) with the calculated predicted acceleration $[(T_{o3}-T_{o4})/I_0 = a_R]$. The methodology advances to diamond 20 and determines whether the observed acceleration is less than the calculated acceleration based on the comparison in block 18. If the observed acceleration is not less than the calculated acceleration, the methodology advances to block 22 and allows the upshift such as from lower to higher or third to fourth gear to occur if also permitted by a shift schedule (not shown, but see U.S. Pat. No. 4,875,391). The electronic controller then performs the lower to higher or third to fourth gear upshift. The methodology then advances to bubble 24 and continues.

In diamond 20, if the observed acceleration is less than the calculated acceleration, the methodology advances to block 26 and inhibits the upshift from the lower to higher gear such as from third to fourth gear. The electronic controller then inhibits or prevents the transmission from shifting from third to fourth gear as long as the observed acceleration is less than the calculated acceleration. The methodology then advances to bubble 24 and continues.

In operation, when the vehicle begins the climb, it loses speed and the throttle is increased in an attempt to maintain speed as illustrated in FIG. 3. This results in a fourth to third gear downshift which permits achieving the previous speed. When the throttle is reduced to simply maintain speed, a third to fourth (3-4) gear upshift would normally be made and the cycle would repeat as illustrated by the dotted lines. The shift inhibit calculation, however, prevents a third to fourth gear upshift until the grade climb is completed, during the time period 30 as illustrated in FIG. 3. The value of $a_R$, the minimum calculated 4th gear acceleration level required to permit a shift, is initialized at a nominal value. Thereafter, it is increased somewhat during periods of "calculated negative fourth gear acceleration" and reduced during periods indicating at least moderate fourth gear acceleration capability. This provides a natural hysteresis for the 3-4 inhibit function and accommodates brief reductions in grade without resulting in 3-4 busyness. It should be appreciated that the method according to the present invention may be used for other upshifts besides a third to fourth gear upshift.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. In a fully automatic transmission system associated with an engine, a method of adaptively scheduling a third to fourth gear upshift of the gear assembly, said method comprising the steps of:

sensing an output speed of the transmission in third gear over a predetermined time period;

determining a current acceleration in third gear based on a change in sensed output speed;

determining a predicted acceleration in fourth gear;

comparing the predicted acceleration with a required acceleration;

determining whether the predicted acceleration is less than the required acceleration based on the comparison;

if the predicted acceleration is not less that the required acceleration, enabling the upshift to occur; and if the predicted acceleration is less than the required acceleration, delaying the upshift of the gear assembly until the predicted acceleration is greater than or equal to the required acceleration.

2. In an automatic electronically controlled transmission system of a vehicle, a method of adaptively scheduling an upshift of a gear assembly of the transmission system, comprising the steps of:

sensing a speed value which is indicative of vehicle speed over a predetermined time period;

determining a current acceleration value for the vehicle from the sensed speed value while the gear assembly of the transmission is operating in a gear which is lower than a highest available gear;

determining whether the vehicle will be capable of providing a predetermined value of acceleration after an upshift of the gear assembly to a higher gear;

enabling an upshift of the gear assembly to a next higher gear if the vehicle will be capable of providing the predetermined value of acceleration; and preventing an upshift of the gear assembly to the next higher gear if the vehicle will not be capable of providing the predetermined value of acceleration.

3. The method according to claim 2, wherein the step of determining whether the vehicle will be capable of providing the predetermined value of acceleration includes the steps of calculating a predicted acceleration value for the vehicle in the current gear which indicates capability for achieving the predetermined value of acceleration in the next higher gear and comparing the current acceleration value with the predicted acceleration value to determine whether the vehicle will be capable of providing said predetermined value of acceleration after an upshift of the gear assembly to a high gear.

4. The method according to claim 3, wherein the predicted acceleration value is based at least in part upon a continually updated atmospheric pressure value.

5. The method according to claim 2, wherein the predetermined value of acceleration is greater than or equal to zero.

6. The method according to claim 2, wherein the predetermined value of acceleration is initially set to a nominal value, and thereafter the predetermined value of acceleration is adjusted in response to predicted vehicle acceleration in the higher gear of operation.

7. The method according to claim 2, where the speed value sensed is an output speed of the transmission system.

* * * * *